United States Patent Office 3,598,840
Patented Aug. 10, 1971

3,598,840
3-ACETOXY-FLAVANONES AND THEIR PRODUCTION
Bernard Majoie, Dijon, France, assignor to Societe de Recherches Industrielles, Dijon, France
No Drawing. Filed July 25, 1968, Ser. No. 747,501
Claims priority, application France, July 26, 1967, 862; Feb. 15, 1968, 883
Int. Cl. C07d 7/20
U.S. Cl. 260—345.2
8 Claims

ABSTRACT OF THE DISCLOSURE

This disclosure concerns compounds of the general formula:

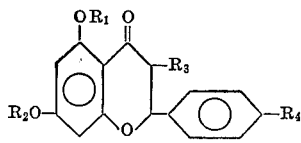

where
$R_1 = R_2 =$ —H, —$CH_3$, —$C_2H_5$,
$R_3 =$ —$OCOCH_3$, —OH,
$R_4 =$ —H, —OH, —$OCH_3$, —$OC_2H_5$, —Cl,
and alkali metal salts thereof. These compounds show anti-nephrotoxic properties. These compounds are characterized chemically by the presence of a hydroxy or acetoxy radical in the 3-position. The invention is also concerned with methods of synthesis which consist successively in condensing acetonitrile and phloroglucinol or its alkoxy derivative in ether in the presence of zinc chloride to obtain trihydroxy-acetophenone or its alkoxy derivative; condensing this product with benzaldehyde or its para-hydroxy or alkoxy derivatives to obtain 5,7,4'-trihydroxy-flavanone. Alternately the product obtained in the first step can be condensed with p-chloro-benzaldehyde to obtain 5,7-dihydroxy chloroflavanone or its alkoxy derivatives. On the product obtained is introduced an acetoxy radical in the 3-position by maintaining this compound boiling under reflux in ethyl alcohol in the presence of iodine and of a metallic acetate such as an acetate of silver, lead, sodium or zinc in order to obtain 3-acetoxy-5,7,4'-trihydroxy-flavanone or its derivatives. The product obtained is saponified with dilute sodium to obtain 3,5,7,4'-tetra-hydroxy-flavanone or its derivatives.

---

This invention relates to new synthetic compounds of the flavanones series. The invention is also concerned with pharmaceutical preparations containing at least one of these compounds together with a suitable carrier which can be administered by parenteral or by other methods.

The compounds of the invention are characterized by anti-nephrotoxic properties. Certain flavanones have already been obtained by extraction or by synthesis in particular from omega-benzyl-o-hydroxy acetophenone or from tri-hydroxy-acetophenone or by partial synthesis from chalcones or from flavanones.

These extracted or synthetic methods which furnish compounds having structures resembling those of the compounds in accord with the invention offer in particular the disadvantage of a small yield and/or requiring costly starting materials.

In accord with the invention there are obtained medicaments based on compounds having the following general formula:

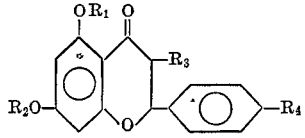

wherein
$R_1 = R_2 =$ —H, —$CH_3$, —$C_2H_5$,
$R_3 =$ —$OCOCH_3$, —OH,
$R_4 =$ —H, —OH, —$OCH_3$, —$OC_2H_5$, —Cl,
and alkali metal salts thereof.

The compounds of the above given formula can be prepared in several ways:

(1) By condensation of acetonitrile and phloroglucinol or of its alkoxy derivative in ether in the presence of zinc chloride to obtain trihydroxy acetophenone or its alkoxy derivative.

(2) In condensing the previous product with benzaldehyde or its meta or para-hydroxy or alkoxy derivative to obtain 5,7,4'-trihydroxy flavanone or 5,7,5'-flavanone or one of their alkoxy derivatives or in condensing the product obtained in (1) with p-chloro-benzaldehyde to obtain 5,7-dihydroxy-4'-chloro-flavanone or its alkoxy derivatives.

(3) In introducing an acetoxy radical in the 3-position on the product obtained in (2) by maintaining it boiling under reflux in ethyl alcohol in the presence of iodine and a metallic acetate such as the acetate of silver, lead, sodium, or zinc to obtain 3-acetoxy 5,7,4'-tri-hydroxy flavanone or its derivatives.

(4) In saponifying the product in (3) with dilute sodium to obtain 3,5,7,4'-flavanone or its derivatives.

DESCRIPTION OF PREFERRED EMBODIMENTS (I) Preparation of tri-hydroxy-acetophenone or its alkoxy derivatives (A) Tri-hydroxy-acetophenone 0.25 mole of acetonitrile,
0.25 mole of phloroglucinol or its dihydroxy or dimethoxy derivatives,
15 g. of zinc chloride, and
400 ml. of anhydrous ether are introduced in a flask which is placed in a cooling mixture (ice and sodium chloride for example).

A rapid stream of dry hydrogen chloride is passed through this mixture for about 2 hours. The flask is left in a refrigerator for 24 hours and dry hydrogen chloride is again passed therethrough.

A yellow precipitate of amine hydrochloride forms. This substance is crystallized and collected on a filter and hydrolized by heating for an hour under reflux in 400 to 500 ml. of water.

There is obtained 30 g. of a yellow precipitate corresponding to ketone (A) or a yield of 71%.

(A)

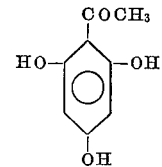

This tri-hydroxy-acetophenone has the molecular weight of 168 and is an orange product soluble in alcohol and in acetone and insoluble in water and more or less soluble in ethyl ether.

Its melting point on a Maquenne block is of 217–219° C.

(B) O,p,-dimethoxy-O-hydroxy-acetophenone.—39 g. (0.25 mole) of dimethoxy-phlorglucinol are substituted for phlorglucinol and are treated as above.

The resulting product has the same properties as product (A).

(C) O,p - di-ethoxy-O-hydroxy-acetophenone.—42 g. (0.25 mole) of di-ethoxy-phloroglucinol are substituted to phloroglucinol and are treated according to (A).

The ketone thus obtained has a molecular weight of 210 and has the same properties as ketone (A).

(II) Preparation of 5,7,4'-trihydroxy-flavanone and of its derivatives (1) 5,7,4'-tri-hyroxy-flavanone 16.8 g. of compound (A) (0.1 mole) and
12.2 g. of p-hydroxy-benzaldehyde (0.1 mole) are intimately mixed and introduced in a flask.
50 ml. of 50% hydrochloric acid are then poured on this mixture which becomes yellow.

The flask is allowed to rest 24 hours at ambient temperature.

25 ml. of acetic acid are added after this time, the mixture becomes orange. It is allowed to rest for 48 hours at ambient temperature.

25 g. of unpurified product equal to 90% of its theoretical yield are obtained by filtering then by successive washings in hot water.

The product is then purified either by dissolving in 60° alcohol and precipitating with water or by dissolving in ethyl acetate and precipitating by the addition of petroleum ether.

The 5,7,4'-tri-hydroxy-flavanone having the empirical formula $C_{15}H_{12}O_5$ has a molecular weight of 272 and is an orange red powder soluble in alcohol, in acetone, dioxane, insoluble in water, chloroform and cyclohexane.

Its melting point on a Maquenne block is 247–248° C.

(2) 5-7-di-methoxy-4'-hydroxy-flavanone.—19.6 g. of the above ketone (B) (0.1 mole) are condensed with p-hydroxy-benzaldehyde as in (1) above.

There is obtained 27 g. of 5-7-dimethyoxy-4'-hydroxy-flavanone having the empirical formula $C_{17}H_{16}O_5$ with a molecular weight of 300 and having the same properties as the previous compound.

(3) 5-7-di-ethoxy-4'-hydroxy-flavanone.—21 g. of ketone (C) (0.1 mole) are condensed with p-hydroxy-benzaldehyde under the same conditions as described under 1 above.

There is obtained in this manner 28.5 g. of di-ethoxy-4'-hydroxy-flavanone having the empirical formula $C_{19}H_{20}O_5$ with a molecular weight of 314.

(4) Substituted-5-7-di-hydroxy-flavanone.—16.8 g. of ketone (A) are treated as in (1) above in the presence of a benzaldehyde derivative of the formula:

where $R_1$=—H, —OH, —OCH$_3$, —OC$_2$H$_5$, —Cl
which results in a 5-7-dimethoxy-flavanone of the general formula:

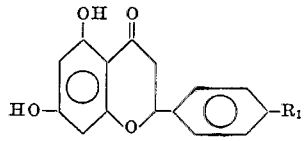

or:

for $R_1$=—OCH$_3$ by condensation of 13.6 g. of p-methoxy-benzaldehyde there is obtained 25 g. of 5-7-dihydroxy-4'-methoxy-flavanone (3) having a molecular weight of 286 and having the properties of substituted 5-7-dimethoxy-flavanone compound 1.
for $R_1$=—OC$_2$H$_5$ by condensing 15 g. of p-ethoxy-benzaldehyde, there is obtained 27 g. of 5-7-dihydroxy-4'-ethoxy-flavanone (6) having a molecular weight of 300 and having the properties of compound 1.
for $R_1$=—Cl by condensing 14 g. of p-chloro-benzaldehyde there is obtained 26 g. of 5-7-dihydroxy-4'-chloro-flavanone having a molecular weight of 290.5 and the properties of compound (1).

(5) Substituted-5-7-di-methoxy-flavanone.—19.6 g. of ketone (B) (0.1 mole) are condensed under the same conditions as described in paragraph 1 with a benzaldehyde derivate of the formula:

wherein $R_1$=—H, —OH, —OCH$_3$, —OC$_2$H$_5$, —Cl
which leads to a 5-7-dimethoxy-flavanone of the general formula:

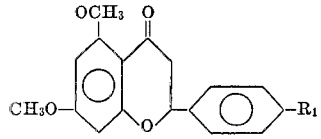

where
for $R_1$=—OCH$_3$ by condensing 13.6 g. of p-methoxy-benzaldehyde there is obtained 28.5 g. of 5-7-4'-tri. methoxy-flavanone where the molecular weight is 314 and having the same general properties as compound (1).
for $R_1$=—OC$_2$H$_5$ by condensing 15 g. of p-ethoxy-benzaldehyde there is obtained 29.5 g. of 5-7-dimethoxy-4'-ethoxy-flavanone having a molecular weight of 328 and the properties of the compound 1 above.
for $R_1$=—Cl by condensing 14 g. of p-chloro-benzaldehyde there is obtained 28.5 g. of 5-7-dimethoxy-4'-chloro-flavanone with the molecular weight of 318.5 and the properties of compound 1.

(6) Substituted-5-7-di-ethoxy-flavanones.—21 g. of ketone (C) (0.1 mole) are condensed under the conditions described in paragraph 1 with a benzaldehyde derivative of the formula:

wherein $R_1$=—H, —OH, —OCH$_3$, —OC$_2$H$_5$, —Cl which leads to a 5-7-di-ethoxyflavanone having the general formula:

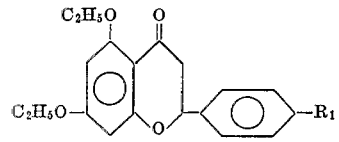

where:
$R_1$=—OCH$_3$ and $R_2$=—H by condensing 13.6 g. of p-methoxy-benzaldehyde there is obtained 29.5 g. of 5-7-di-ethoxy - 4' - methoxy-flavanone with a molecular weight of 328 and the properties of the compound of paragraph 1.
for $R_1$=—OC$_2$H$_5$ by condensing with 15 g. of p-ethoxy-benzaldehyde there is obtained 31 g. of 5-7-4'-triethoxy-flavanone with a molecular weight of 342 and the properties of the compound of paragraph 1.
for $R_1$=—Cl by condensing with 14 g. of p-chloro-benzaldehyde there is obtained 30 g. of 5-7-di-ethoxy-4'-chloro-flavanone having a molecular weight of 332.5 and the properties of the compound of paragraph 1.

(III) Preparation of 5-7-4'-trihydroxy-3-acetoxy-flavanone and derivatives (1) 5-7-4'-trihydroxy - 3 - acetoxy-flavanone.—10 g. of 5-7-4'-trihydroxy-flavanone (the compound of paragraph 1 above) were mixed with 13.5 g. of silver acetate and 250 ml. of ethyl alcohol and brought to boiling in a flask.

9.70 g. of iodine in 200 ml. of ethyl alcohol are added to this mixture and the whole is brought to boiling on the reflux for 4 hours. The mixture is brownish and after cooling there appears a fine grey precipitate. This precipitate is silver iodide. It is concentrated by distillation under vacuum. A brown resin crystallizes progressively and there is obtained 7 g. of unpurified product corresponding to 57% of the theoretical yield.

The compound is purified by dissolving in alcohol at 95°; this solution is then poured into water acidified with hydrochloric acid to give a product having the empirical formula $C_{17}H_{14}O_7$ and the structural formula:

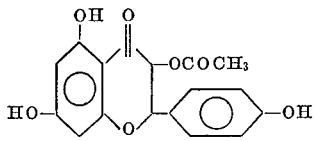 (B)

this compound has a molecular weight of 331. Its infrared spectra shows maximum absorption at 3000, 2400, 1500, 1420, 1320, 1200 and 1925 mu.

The ultra-violet spectra in aqueous solution has two maxima at 230 and 290 mu.

These characteristics remain unchanged with the sodium derivative which can be obtained by placing the above compound in slightly basic medium, the sodium derivative being water soluble.

The above described acetoxylation can also be carried out with 5 g. of 5-7-4' - trihydroxy-flavanone (0.0183 mole), —3.20 g. of sodium acetate (0.039 mole) and 95 ml. of ethyl alcohol are brought to boiling in a flask.

—4.60 g. of iodine (0.036 mole) dissolved in 90 ml. of ethyl alcohol are then added to the mixture which is boiled with reflux for 4 hours.

The liquid is then distilled to dryness and the residue is taken up in water to eliminate the sodium iodide which is thus formed.

This leads to the unpurified product which can be purified by dissolving in ethyl alcohol at 90° and reprecipitated with water acidified with hydrochloric acid.

Instead of sodium acetate there can be used lead or zinc acetate with the same results.

(2) Substituted-5-7-dihydroxy - 3 - flavanones.—5-7-dihydroxy-flavanones upon treatment with iodine and silver acetate as above indicated lead to the corresponding derivatives which have the general formula:

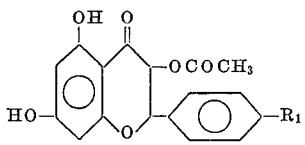

these compounds have the same properties as compound (B).

(3) 5-7-dimethoxy-3-acetoxy-4'-hydroxy - flavanone.— Under the conditions of 11 g. of 5-7-dimethoxy-4'-hydroxy-flavanone lead to 7.5 g. of 5-7-dimethoxy-3-acetoxy-4'-hydroxy-flavanone which have the molecular weight of 358 and the same properties as the compounds (B).

(4) 5-7-dimethoxy - 3 - acetoxy - flavanones (substituted).—5-7-dimethoxy-flavanones can be treated as indicated under (A) to obtain the corresponding derivatives which have the general formula:

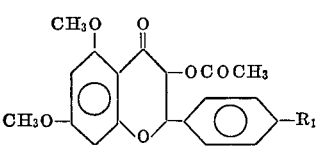

and which have the same properties as compound (B).

(5) 5-7-diethoxy - 3 - acetoxy-4'-hydroxy-flavanone.— Under the conditions of (A) 11.5 g. of 5-7-diethoxy-4'-hydroxyflavanone there can be obtained about 8 g. of 5-7-diethoxy-3-acetoxy - 4' - hydroxy-flavanone which has the formula $C_{21}H_{22}O_7$

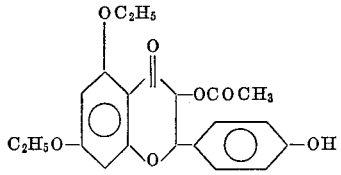

with a molecular weight of 372 and the general properties of compound B.

(6) 5-7-diethoxy-3-acetoxy-flavanones (substituted).— The 5-7-diethoxy-flavanones upon successive reaction with iodine and silver acetate yield the corresponding derivatives to the general formula:

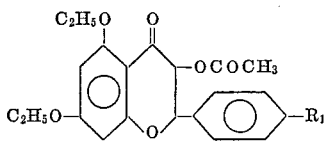

These compounds have the same properties as compounds (B).

(IV) Preparation of 3-5-7-4'-tetrahydroxy-flavanone and derivatives thereof (A) 3-5-7-4'-tetrahydroxy-flavanone. — 10 g. of compound (B) are saponified in 200 ml. of sodium and plunged in a steam bath for 10 minutes. There is obtained a dark brown solution. After cooling, the addition of hydrochloric acid (10%) gives a precipitate which is washed dried, and purified by recrystallization in water and alcohol. There is obtained 9 g. of 3-5-7-4'-tetrahydroxy-flavanone ($E_1$) or a yield of 95% of theoretical.

The emprical compound of the formula is: $C_{15}H_{12}O_6$ and the molecular weight is 289.

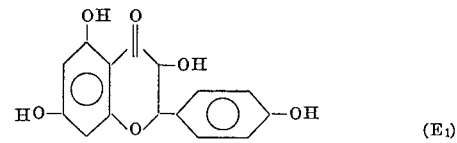 ($E_1$)

Its melting point is 238–240° C. with decomposition and its solubilities are the same as those of the corresponding acetoxy derivative.

(B) Derivatives of 3-5-7-trihydroxy - flavanone. — By saponifying the derivatives obtained above under the conditions just described under (A) there are obtained compounds having the general formula:

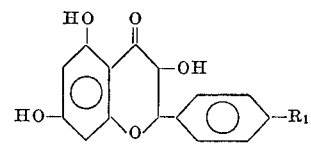

wherein $R_1=$ —H, —OH, —OCH$_3$, —OC$_2$H$_5$, —Cl,

These compounds have the general properties of compound ($E_1$).

(C) 5-7-dimethoxy - 3-4' - dihydroxy-flavanone. — 10 g. of 5-7-dimethoxy-3-acetoxy-4'-hydroxy-flavanone are saponified as indicated in IV (A). There is obtained 9 g. of 5-7-dimethoxy-3-4'-dihydroxy-flavanone ($F_1$) having the emprical formula: $C_{17}H_{14}O_6$

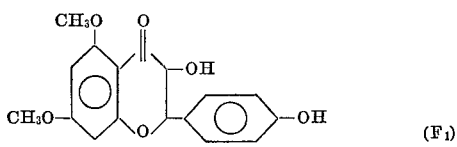 ($F_1$)

with a molecular weight of 316 and the same properties as compound ($E_1$).

(D) Derivatives of 5-7-dimethoxy - 3 - hydroxy-flavanone. — By saponifying 5-7-dimethoxy-3-acetoxy-flavanone there are obtained compounds having the general formula:

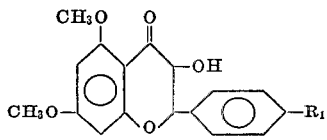

wherein $R_1 =$ —H, —OH, —OCH$_3$, —OC$_2$H$_5$, —Cl,

These compounds have the same general properties as compound ($E_1$).

(E) 5-7-di-ethoxy-3-4'-dihydroxy-flavanone. — 10 g. of 5-7-di-ethoxy-3-acetoxy - 4' - hydroxy-flavanone ($D_1$) are saponified under the conditions indicated in IV (A).

There is obtained 9 g. of 5-7-di-ethoxy-3-4'-dihydroxy-flavanone ($G_1$) having the empirical formula: $C_{19}H_{18}O_6$

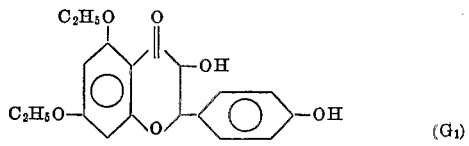

with a molecular weight of 330 and the properties of ($E_1$).

(F) Derivatives of 5-7-di-ethoxy - 3 - hydroxy-flavanone. — By saponifying substituted 5-7-di-ethoxy - 3 - acetoxy-flavanones under the conditions described in IV (A) there is obtained compounds having the general formula:

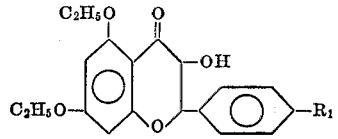

wherein $R_1 =$ —H, —OH, —OCH$_3$, —OC$_2$H$_5$, —Cl,

These compounds have the general properties of compound ($E_1$).

PHARMACOLOGICAL STUDY (A) Protocols.—The acute toxicity (LD$_{50}$) of these derivatives has been determined in the mouse.

In most cases only toxicity by intra-peritoneal administration was determined, the oral toxicity being very small (LD$_{50}$ around 10 g./kg.).

The hypotensive effect in the rat and the kidney protecting effect in a hyperuremic rat whose nephritis was induced by a sabacute treatment with Puromycine were also studied.

Also studied was the kidney-protecting effect in the rabbit afflicted with a nephropathic condition induced by bovine albumen.

(B) Results. — Intra-peritoneal administration shows an LD$_{50}$ of the order of 650 mg./kg. for 5-7-4'-tri-hy-hydroxy - 3 - acetoxy-flavanone and for the 3-5-7-4'-tetrahydroxy-flavanone. It increases progressively for derivatives having an alkoxy substituent.

The following results have been noted:
5-7-di-methoxy-3-hydroxy-4'-chloro-flavanone:

$$LD_{50} = 580 \text{ mg./kg.}$$

5-7-4'-tri-methoxy-3-acetoxy-flavanone:

$$LD_{50} = 550 \text{ mg./kg.}$$

Study of cardiovascular activities has shown a hypotensive effect with a dosage of 25 to 50 mg./kg. In order to determine the kidney protecting effect lots of 10 rats received for 7 days Puromycine alone (750 microgrammes per day subcutaneously) or in association with one of the flavanone derivatives.

As is well known, Puromycine increases the rate of sanguin urea following a kidney condition whose histologic aspect recalls a nephritis.

With the dosage of Puromycine used, the hyperazotemia increased between 50 and 80% according to the lots. The 3-acetoxy and 3-hydroxy compounds administered at the rate of 50 to 200 mg./kg. inhibited by 30 to 100% this increase in sanguin urea while macroscopic and microscopic examination of the kidneys of the treated animals indicated a decrease in the signs of histologic condition in the same proportions.

By way of example, the following results (on an average of 10 rats) have been noted during successive tests:

(1)

| | |
|---|---|
| Control lot: | G./l. |
| Starting urea | 0.34 |
| After 7 days of Puromycine administration (750 µg./day) | 0.52 |

Lot treated wth 5-7-4'-tri-hydroxy - 3 - acetoxy-flavanone (200 mg./kg.) with Puromycine:

| | |
|---|---|
| Starting urea | 0.40 |
| After 7 days' treatment or 100% protection | 0.38 |

(2)

| | |
|---|---|
| Control lot: | G./l. |
| Starting urea | 0.27 |
| After 7 days of Puromycine administration (750 µg./g.) | 0.48 |

Lot treated with 5-7-di-ethoxy - 3 - acetoxy-4'-hydroxy-flavanone (100 mg./kg.) and Puromycine:

| | |
|---|---|
| Starting urea | 0.30 |
| After 7 days of treatment or 61% protection | 0.38 |

Histologic examinations corresponding to these various tests have confirmed the previous results.

The kidneys of intoxicated rats (control rats) had a glomerular condition characterized by a swelling of the epithelial cells, causing a shrinking of the extra-vascular space of the Bowman capsules a beginning of hyalus degeneration and associated with a beginning of a tubular proximal condition characterized by the presence of numerious PAS+deposits while the kidneys of intoxicated rats treated with a flavanone derivative never showed the tubular condition and only occasionally a sign of glomerular condition.

A similar study was made with rabbits. The animals were Albino males weighing from 1.5 to 2 kg. and divided into lots of 15. The nephrotoxic agent was bovine albumen administered I.V. at the rate of 500 mg.

Twelve to fifteen days after the injection, the first signs of glomerular condition appeared biologically in the form of an albuminuria with an increase rate, on the histologic side they were characterized by a swelling of the epithelial cells a beginning of hyalus degeneration accompanied by an extra-vascular infiltration of lymphocyte cells.

The 3-acetoxy and 3-hydroxy-flavanone derivatives administered at daily doses of 50 to 200 mg./kg. starting on the day of the albumen injection inhibited the appearance of these conditions to the extent of 60 to 100% in rabbits both biologically and histologically.

By way of examples, the following observations were noted upon sacrificing the animals 15 days after injection of bovine albumen:

(1) Control lot: albuminuria of 0.8 to 4.5 g./l. in 12 out of 15 animals; presence in the same subjects of several leucocyte infiltrations, in particular at the level of the cortico-medullar junction with swelling of the capsular epithelium.

With the lot treated for 10 days with 3,5,7-trihydroxy-4-chlorogalvanone (150 mg./kg./day) only 3 animals out of 15 showed an albuminuria of 0.5–0.8 and 1 g./l.; histologic examination showed the presence of some signs of epithelial swelling at the level of the Bowman capsules in 7 animals, a start of hyalus degeneration in the animal whose albuminuria was 1 g./l.

(2) Control lot: albuminuria of 0.7 to 12 g./l. in 11 of the 15 animals; presence in the same animals of leucocytis infiltration, start of sclerosis with thickening of the Bowman capsule and compression of the capillaries in 4 of the animals whose albuminuria was greater than 7 g./l.

Lot treated for 15 days with 5,7,4' - trihydroxy-4-acetoxy-flavanone (100 mg./kg./day); only three animals out of 15 showed an albuminuria at 0.35, 0.7 and 1.20 g./l.; the same animals and two others showed signs of hypertrophy of the epithelial cells towards the intracapsular space with reduction of capillary light and rare leucocytic infiltrations.

THERAPEUTIC DATA

The nephritic syndromes are a class of conditions whose etiology and pathology are very different. Because of the type of activity evidenced during pharmacological experiments, the treatment with flavanone derivatives was started in certain cases which seemed particularly susceptible to their administration, that is to say in the cases of:

glomerulonephritis, acute and sub-acute,
membraneous glomerulitis,
acute kidney deficiency following diabetis or sub-acute endocarditis or diphtheria,
recurring gravid toxemia,
acute nephropathy resulting from accidental medicamentous intoxication.

In the ensemble of the cases, the arterial tension, the water retention, the azotemia, the azoturia, the proteinuria and the proteinemia, and the electrolytic equilibrium were followed. Certain cases constituted the object of a histological examination after biopsic puncture.

By way of examples the following clinical tests can be reported:

Case 1: M. Rob—47 years old.—Afflicted with a nephritis with intermittent renal insufficiency following a diabetic condition (maximum glycema observed: 2.05 g./l.).

before treatment:

arterial tension: 13.5–18
diuresis: 0.7 l./day
uremia: 0.80 g./l.
azoturia: 5.50 g./24 h.
proteinemia: 52 g./l.
proteinuria: 1.20 g./24 h.

A treatment with 5,7,4'-tri-hydroxy-3-acetoxy-flavanone was administered at the rate of 6 capsules of 200 mg. every 24 hours for 4 days.

The uremia having returned to 0.65 g./l., the treatment was continued at the rate of 4 capsules per day. A new test was made after 10 days of treatment:

arterial tension: 12–16.5
diuresis: 1.200 l./day
uremia: 0.55 g./l.
azoturia: 11.5 g./24 h.
proteinemia: 60 g./l.
proteinuria: traces.

Case 2: Mrs. Bat—32 years old.—Suffering from chronic renal condition, treated for 15 months with membranous glomerulitis resulting most probably from a chronic infectious condition at the level of the maxillary sinuses.

Before treatment:

arterial tension: 9–14
diuresis: 0.9 l./day
azoturia: 8.5 g./24 h.
proteinemia: 60 g./l.
proteinuria: 0.40 g./24 h.

A prolonged treatment with 5,7,4'-tri-hydroxy-3- acetoxy-flavanone was started at the rate of 2 capsules of 50 mg. per 24 hours.

After 3 weeks of this treatment, a clear improvement in the clinical condition was noted as follows:

arterial tension: 8–11.5
diuresis: 1.2 l./24 h.
uremia: 0.37 g./l.
azoturia: 13.5 g./24 h.
proteinemia: 62.5 g./l.
proteinuria: traces.

A biopsic puncture made at the end of a month of treatmment revealed the absence of sub-epithelial proliferation and a decrease of the flat podocytis encountered during the previous examination.

Case 3: M. San—28 years old.—Suffering from an acute renal insufficiency with oliguria and hyperazotemia resulting from a massive intoxication with carbon tetrachloride:

arterial tension: 16–19.5
diuresis: 0.150 l./24 h.
uremia: 1.20 g./l.
azoturia: 3.20 g./24 h.
proteinemia: 57 g./l.
proteinuria: 5 g./l.

The ionic balance was particularly upset indicating a considerable water retention.

An emergency treatment was initiated by slow perfusion at the rate of 1 g. of 5, 7, 4'-tri-hydroxy-3-acetoxy-flavanone for 24 hours.

The azotemia decreased progressively to 0.95 g./l. on the first day to 0.80 g./l. the third day. Rectal administration was then substituted.

Eight days after the start of the treatment, a new examination showed:

arterial tension: 9–13
diuresis: 1.700 l./24 h.
uremia: 0.35 g./l.
azoturia: 22 g./day
proteinemia: 65 g./l.
proteinuria: 0

The ionic balance became normal.

Different therapeutic forms are necessary for the clinical employment of 3,5,7,4'-tetra-hydroxy-flavanone and its derivatives: in particular injectible forms containing 250 or 500 mg. of the active ingredient for example as well as suppositories containing 100, 200, 250 mg., capsules containing 50, 100, 200 mg. and drops containing 50 or 100 mg./ml. The active ingredient can be used alone or associated with any other therapeutic substance useful in the case of various nephritis.

ADMINISTRATION

The flavanone derivatives of the invention can be administered in the form of tablets, coated or not, gels, capsules, suspensions in drinkable ampules or containers containing 50, 100 or 200 mg. for example. Rectally in the form of suppositories containing 100, 200, 250 mg. for example, parenterally in ampules of an injectible suspension containing 250 or 500 mg. for example or in the form of the sodium salts in solution in mono sodium carbonate at 1.5% for example.

Each of these unit dosage forms can contain one or several derivatives in accord with the invention associated or not with other therapeutic elements used in the treatment of nephritic conditions.

What is claimed is:

1. A compound having the formula:

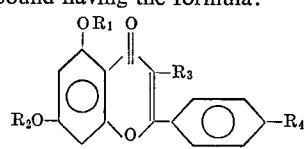

wherein $R_1$ and $R_2$ are —$CH_3$, or —$C_2H_5$, $R_3$ is —$OCOCH_3$ and $R_4$ is —$OCH_3$, —$OC_2H_5$ or —Cl and alkali metal salts thereof.

2. A compound selected from 5,7, dimethoxy-3-acetoxy-4′-hydroxy-flavanone and alkali metal salts thereof.

3. A compound selected from 5, 7, 4′, tri-hydroxy-3-acetoxy-flavanone and alkali metal salts thereof.

4. A compound selected from 5, 7-di-ethoxy-3-acetoxy-4′hydroxy-flavanone and alkali metal salts thereof.

5. A compound according to claim 1 which is 5,7,4′-trimethoxy-3-acetoxy-flavanone.

6. A compound selected from 5,7-dimethoxy-3-hydroxy-4′-chloroflavanone and alkali metal salts thereof.

7. Process for making a compound having the formula of claim 1 comprising:

condensing acetonitrile and phloroglucinol or an alkoxy derivative thereof to form trihydroxy-acetophenone or an alkoxy derivative thereof;

condensing said acetophenone with p-hydroxy or p-alkoxy benzaldehyde to obtain 5,7,4′-trihydroxy flavanone or an alkoxy derivative thereof; and introducing an acetoxy group in the 3-position of said compound by heating said compound in alcohol in the presence of iodine and a metallic acetate of the group consisting of silver, lead, sodium and zinc.

8. Process according to claim 7, wherein the final product is saponified to form a 3,5,7,4′ flavanone.

References Cited

UNITED STATES PATENTS 2,744,919   5/1956   Kurth _____ 260—345.2
3,462,455   8/1969   Kramer et al. _____ 260—345.2X

OTHER REFERENCES

Dean: "Naturally Occurring Oxygen Ring Compounds," Butterworth & Co. Pub. Ltd., London (1963), p. 359.

JOHN M. FORD, Primary Examiner

U.S. Cl. X.R.

260—592; 424—283